(12) United States Patent
Li (10) Patent No.: US 9,038,501 B2
(45) Date of Patent: May 26, 2015

(54) BICYCLE HANDLE ASSEMBLY FOR HANDLEBAR

(71) Applicant: Hung Chung Tien International Co., Ltd., Changhua County (TW)

(72) Inventor: Jin-Cang Li, Changhua County (TW)

(73) Assignee: Hung Chung Tien International Co., Ltd., Changhua County (TW)

( * ) Notice: Subject to any disclaimer, the term of this patent is extended or adjusted under 35 U.S.C. 154(b) by 0 days.

(21) Appl. No.: 13/948,468

(22) Filed: Jul. 23, 2013

(65) Prior Publication Data

US 2015/0027268 A1    Jan. 29, 2015

Related U.S. Application Data

(63) Continuation-in-part of application No. 12/814,380, filed on Jun. 11, 2010, now abandoned.

(30) Foreign Application Priority Data

Nov. 5, 2009 (TW) ................................. 98220498 U (51) Int. Cl.
*B62K 21/26* (2006.01)
*B62K 21/12* (2006.01)

(52) U.S. Cl.
CPC ............. *B62K 21/26* (2013.01); *B62K 21/12* (2013.01)

(58) Field of Classification Search
USPC .................... 74/551.8, 551.9; 362/473, 474
See application file for complete search history.

(56) References Cited

U.S. PATENT DOCUMENTS

| | | | |
|---|---|---|---|
| 1,416,386 A | 5/1922 | Selah | 285/197 |
| 2,469,944 A | 5/1949 | Bauters | 340/432 |
| 4,716,502 A | 12/1987 | Schott et al. | 362/474 |
| 4,875,142 A | 10/1989 | Spector | 362/474 |
| 5,580,152 A | 12/1996 | Carter | 362/474 |
| 5,738,326 A | 4/1998 | Liao | 248/405 |
| 5,983,747 A | 11/1999 | Chen | 74/551.9 |
| 6,155,743 A * | 12/2000 | Chen | 403/374.1 |
| 6,536,912 B2 | 3/2003 | Parker | 362/206 |
| 6,719,257 B1 | 4/2004 | Greene et al. | 248/411 |
| 6,742,911 B1 | 6/2004 | Chen | 362/206 |
| 6,880,951 B2 | 4/2005 | Yoon | 362/206 |
| 7,374,309 B2 | 5/2008 | Cutler-Bass | 362/203 |
| RE41,098 E | 2/2010 | Yu | 74/551.9 |
| 7,850,332 B2 * | 12/2010 | Opolka | 362/206 |
| 7,866,002 B2 * | 1/2011 | Wang | 16/421 |
| 7,871,189 B2 | 1/2011 | Li | 362/474 |
| 7,942,077 B2 | 5/2011 | Lai | 74/551.9 |

(Continued)

*Primary Examiner* — Vicky Johnson
(74) *Attorney, Agent, or Firm* — Alan D. Kamrath; Kamrath IP Lawfirm, P.A.

(57) ABSTRACT

A bicycle handle assembly for a handlebar contains a body including a peripheral fringe and a side fringe connected together to define a receiving space. The receiving space includes a first side and a second side. The peripheral fringe includes a first engaging portion, a first connecting portion and a fixing portion connected with two ends of the first engaging portion. A movable retaining member is installed in the receiving space and includes a second engaging portion, a second connecting portion and a moving portion connected with two ends of the second engaging portion. The second connecting portion is used to connect with the first connecting portion of the body. A locking element is used to force the moving portion toward the fixing portion of the body, so that the external fence of the handlebar is retained tightly between the first engaging portion and the second engaging portion.

8 Claims, 11 Drawing Sheets

(56) References Cited

U.S. PATENT DOCUMENTS

| | | | |
|---|---|---|---|
| 2008/0307923 A1* | 12/2008 | Lai | 74/551.8 |
| 2009/0255093 A1 | 10/2009 | Hsu | 16/421 |
| 2010/0053984 A1 | 3/2010 | Wang | 362/474 |
| 2010/0141146 A1 | 6/2010 | Lu | 315/77 |
| 2011/0041646 A1 | 2/2011 | Huang | 74/551.9 |
| 2011/0103885 A1* | 5/2011 | Li | 403/316 |

* cited by examiner

BICYCLE HANDLE ASSEMBLY FOR HANDLEBAR

FIELD OF THE INVENTION

This application is a Continuation-in-Part of application Ser. No. 12/814,380, filed on Jun. 11, 2010, now abandoned.

BACKGROUND OF THE INVENTION

Description of the Prior Art

A conventional bicycle handle assembly for a handlebar is used on a bicycle and designed in two different types. For example, the bicycle handle assembly is inserted through an outer wall of a metal engaging member by using a force bolt, and the force bolt is fitted on an external fence of a handlebar in the metal engaging member. However, a certain portion of the external fence of the handlebar where it is biased against by a distal end of the force bolt generates stress to cause a deformation on the external fence of the handlebar. Moreover, a nut end of the force bolt is exposed outside due to the metal engaging member being thin, having a poor aesthetics appearance and injuring user's hands easily. Another conventional bicycle handle assembly includes a locking bolt locked on an opening of an elongated gap around the metal engaging member, so that the metal engaging member is fitted to an outer external fence of a handlebar. However, the elongated gap of the bicycle handle assembly causes a poor aesthetics appearance and injures user's hands easily. Besides, the metal engaging member is formed in a C shape that will have a mouth without a closed wall. Therefore, the handlebar cannot be used as an end plug. Also, the metal engaging member can not have enough space to install other components, such as a warning unit, etc.

The present invention has arisen to mitigate and/or obviate the afore-described disadvantages.

SUMMARY OF THE INVENTION

The primary objective of the present invention is to provide a bicycle handle assembly for a handlebar capable of overcoming the shortcomings of the conventional bicycle handle assembly for a handlebar thereof.

A secondary objective of the present invention is to provide a bicycle handle assembly for a handlebar that can apply a retaining force in a circumferential direction to retain a grip on a handlebar securely. When the retaining device, the handlebar, and the grip are connected together, an inner end of the retaining device contacts with an outer end of the grip, so that the outer end of the grip is not exposed outside, to achieve an aesthetics appearance.

A further objective of the present invention is to provide a bicycle handle assembly for a handlebar in which the peripheral fringe is not provided with an elongated gap as in a conventional retaining device, to have an aesthetics appearance and holding comfort.

Another objective of the present invention is to provide a bicycle handle assembly for a handlebar in which the retaining device is designed in a different shape from that of the first embodiment, and a length of the grip is different from that of the first embodiment. Thus, when the retaining device is installed on the handlebar of the bicycle, the retaining device with the grip is used as an auxiliary handle, so that the user maintains different postures based on requirements.

To obtain the above objectives, a bicycle handle assembly for a handlebar provided by the present invention contains:

a grip retained on a handlebar, with the grip including two positioning projections extending outward from an outer side thereof; and a retaining device for the handlebar including a body, a movable retaining member, and a locking element.

The body is one piece and has a peripheral fringe and a side fringe integrally connected with the peripheral fringe to define a receiving space. The receiving space includes a first side and a second side. The peripheral fringe includes a first engaging portion defined on a predetermined position thereof relative to the first side and further includes a first connecting portion and a fixing portion connected with two ends of the first engaging portion.

The movable retaining member is installed in the receiving space of the body relative to the second side and includes a second engaging portion relative to the first engaging portion and further includes a second connecting portion and a moving portion connected with two ends of the second engaging portion respectively. The second connecting portion is used to connect with the first connecting portion of the body.

The first engaging portion includes a first fixing groove defined on an inner wall thereof to receive one of the two positioning projections, and the second engaging portion includes a second fixing groove defined on an inner wall thereof to receive another of the two positioning projections. The first fixing groove includes two arcuate first locking fences formed on two ends thereof, and the second fixing groove includes two arcuate second locking fences formed on two ends thereof.

The locking element is used to force the moving portion of the movable retaining member toward the fixing portion of the body, so that an external fence of the handlebar is retained between the first locking fence of the first engaging portion and the second locking fence of the second engaging portion.

One of the two positioning projections is retained between the first fixing groove of the first engaging portion and the handlebar, and another of the two positioning projections is retained between the second fixing groove of the second engaging portion and the handlebar, such that the grip is fixed on the handlebar.

The side fringe of the body is a closed surface, so that the retaining device forms a closed end plug to close a distal end of the handlebar.

The peripheral fringe of the body is closed and surrounds the side fringe of the body, so that the movable retaining member hides in the receiving space, such that as a user holds the retaining device, the movable retaining member is not touched by the user.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Referring to FIGS. 1-4, a bicycle handle assembly for a handlebar according to a first embodiment of the present invention is fixed on a handlebar 2 of a bicycle and used to emit a warning light. The bicycle handle assembly comprises a retaining device 1 and a grip 3, and the grip 3 includes two positioning projections 3a extending outward from an outer side thereof. The retaining device 1 comprises a body 10 being of one piece, a movable retaining member 20, a locking element 30, a housing 40, and a warning unit 50.

Figure 5:
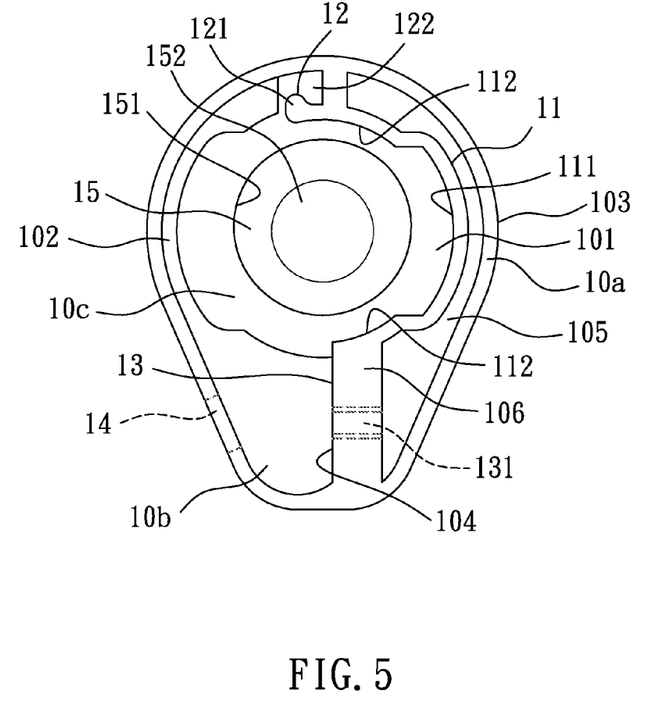
FIG. 5 is a side plan view showing the assembly of a body of the bicycle handle assembly for the handlebar according to the first embodiment of the present invention.

The body 10, as shown in FIG. 5, includes a peripheral fringe 10a and a side fringe 10b connected with each other to define a receiving space 10c. The receiving space 10c includes a first side 101 and a second side 102. The peripheral fringe 10a includes a first engaging portion 11 defined on a predetermined position thereof relative to the first side 101, and further includes a first connecting portion 12 and a fixing portion 13 connected with two ends of the first engaging portion 11 respectively.

The peripheral fringe 10a includes a recessed portion 105 defined between an outer fringe 103 and an inner fringe 104 to be worked easily and to lower weight, and further includes an inner fringe 106 integrally extending from a predetermined position thereof relative to the first side 101. The inner fringe 106 is comprised of the first engaging portion 11, the first connecting portion 12, and the fixing portion 13.

The first engaging portion 11 of the inner fringe 106 is formed in a C shape and includes a first fixing groove 111. The first fixing groove 111 includes two arcuate first locking fences 112 formed on two ends thereof. The first fixing groove 111 is used to retain the positioning projection 3a, and the first locking fence 112 is fitted onto an external fence 2a of the handlebar 2.

The first connecting portion 12 of the inner fringe 106 includes a first hook 121 and a slot 122 defined above the first hook 121. The slot 122 is formed in a hook shape and comprised of the first hook 121 and the inner fringe 104.

The fixing portion 13 of the inner fringe 106 is a flat and straight wall and includes a threaded hole 131 defined thereon.

The peripheral fringe 10a includes an aperture 14 defined on a predetermined position thereof relative to the second side 102 to correspond to the threaded hole 131.

The peripheral fringe 10a in the receiving space 10c of the body 10 includes a circular trench 15, and the trench 15 includes inner threads 151 fixed on an inner surface thereof and a circular orifice 152 formed on a center thereof.

Figure 6:
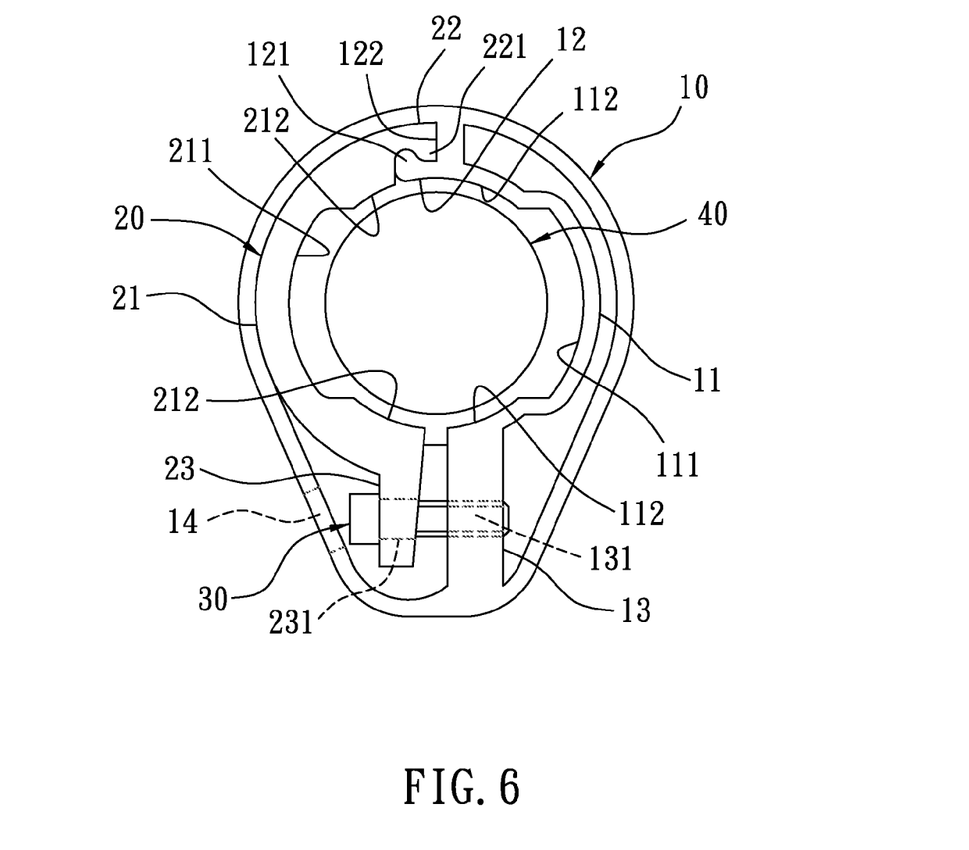
FIG. 6 is a side plan view showing the assembly of the bicycle handle assembly for the handlebar according to the first embodiment of the present invention.

As illustrated in FIG. 6, the movable retaining member 20 is installed in the receiving space 10c of the body 10 relative to the second side 102 and includes a second engaging portion 21 relative to the first engaging portion 11, a second connecting portion 22 and a moving portion 23 connected with two ends of the second engaging portion 21. The second connecting portion 22 is used to connect with the first connecting portion 12 of the body 10.

The movable retaining member 20 includes a C-shaped wall and a flat and straight wall extending from one end of the C-shaped wall, and the second engaging portion 21 is located at the C-shaped wall and includes a second fixing groove 211. The second fixing groove 211 is used to retain another positioning projection 3a and includes two arcuate second locking fences 212 formed on two ends thereof. The second locking fences 212 is fitted onto the external fence 2a of the handlebar 2.

The second connecting portion 22 is located above the C-shaped wall and includes an integrally formed second hook 221 to match with the slot 122 to retain into the slot 122 and engage with the first hook 121, so that one end of the movable retaining member 20 engages with and disengages from the body 10.

The moving portion 23 is located at the flat and straight wall and includes an opening 231 arranged thereon to correspond to the aperture 14 and the threaded hole 131.

Figure 7:
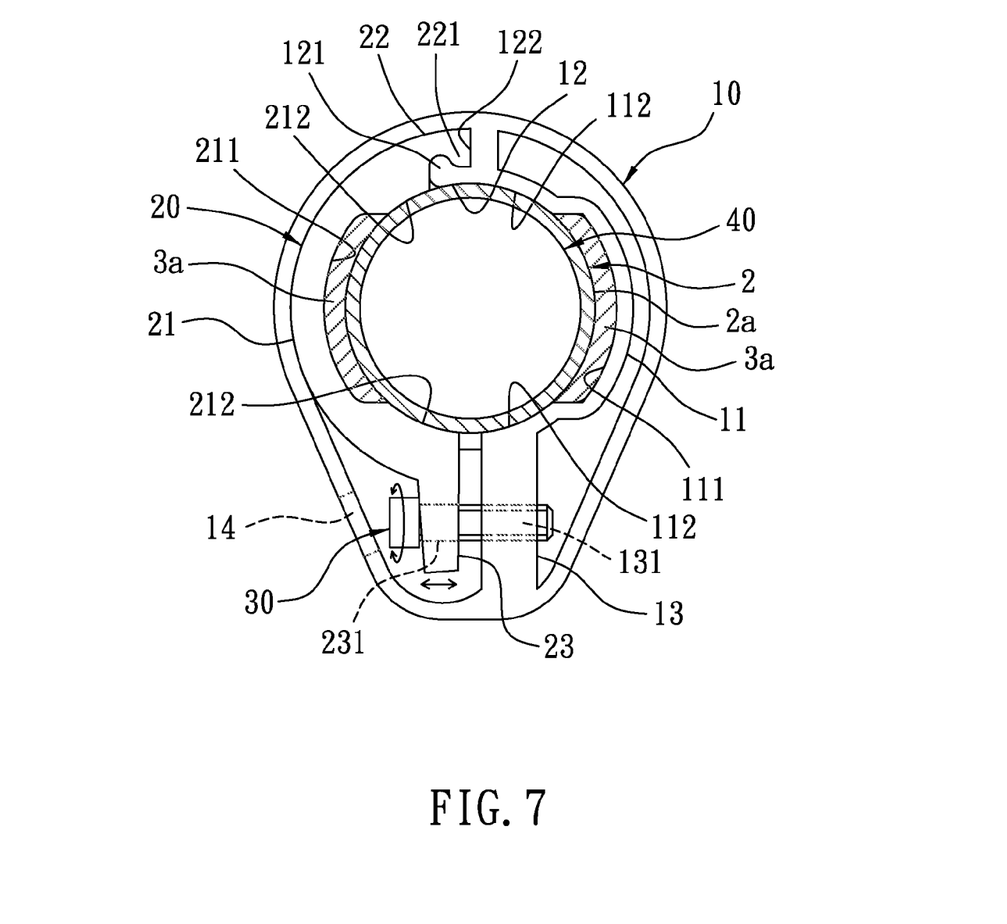
FIG. 7 is another side plan view showing the assembly of the bicycle handle assembly for the handlebar according to the first embodiment of the present invention.

The locking element 30 as shown in FIGS. 6 and 7 is used to force the moving portion 23 of the movable retaining member 20 to move toward the fixing portion 13 of the body 10. In this embodiment, the locking element 30 is a bolt which is inserted from the aperture 14 of the body 10 and then is screwed with the threaded hole 131 of the fixing portion 13 of the body 10 via the opening 231 of the moving portion 23 by using an alien wrench or a screw driver. When the bolt is rotated tightly, the moving portion 23 is moved toward the fixing portion 13 by a force which rotates the bolt tightly, and the second engaging portion 21 moves toward the first engaging portion 11 and deforms lightly. The external fence 2a of the handlebar 2 is retained tightly between the first locking fences 112 of the first engaging portion 11 and the second locking fences 212 of the second engaging portion 21. Thus, the bicycle handle assembly is retained on a distal end of the handlebar 2, and the positioning projections 3a of the grip 3 is retained between the first fixing groove 111 of the first engaging portion 11, the second fixing groove 211 of the second engaging portion 21, and the external fence 2a of the handlebar 2, so that the grip 3 is fixed on the handlebar 2 securely.

Figure 3:
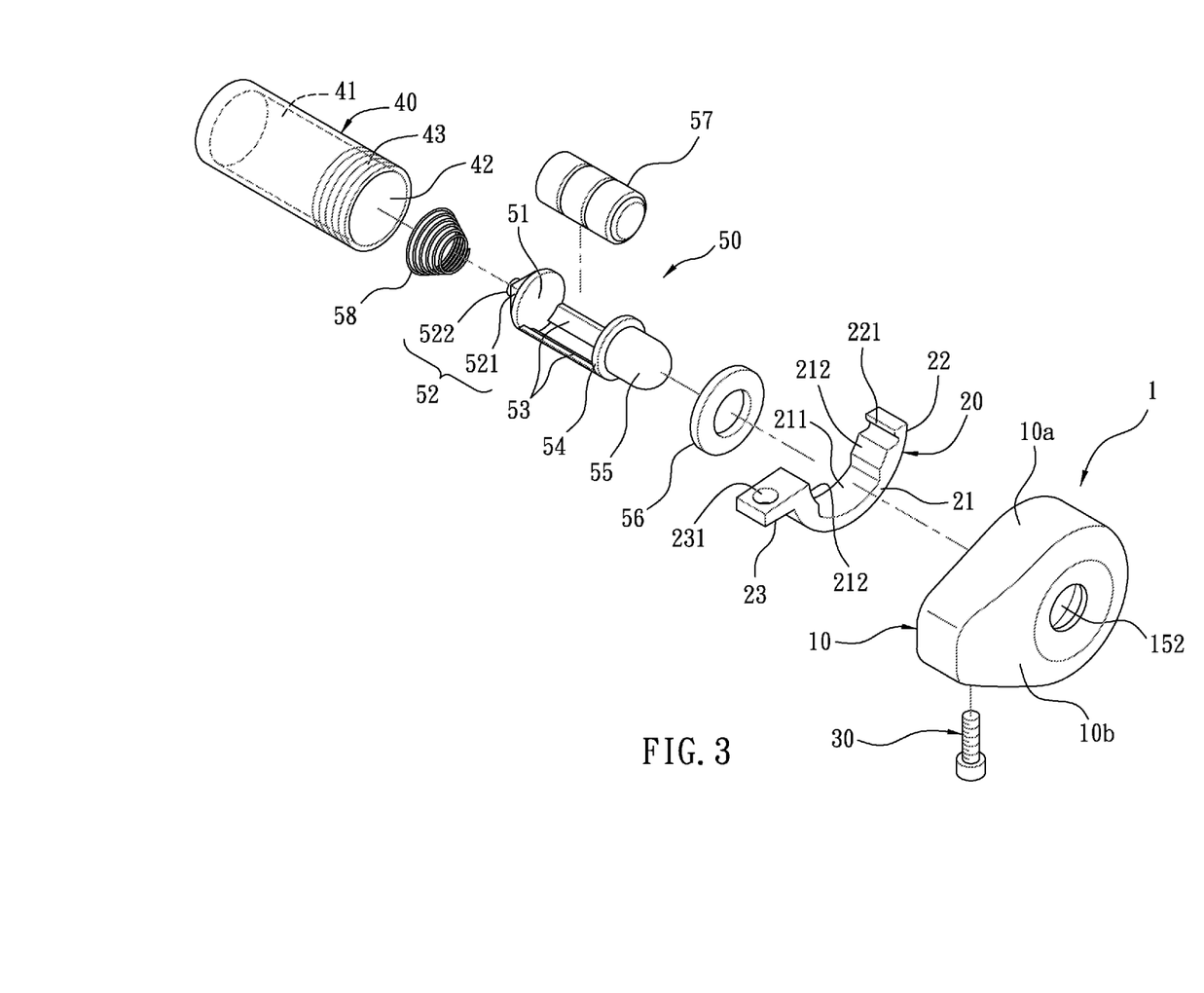
FIG. 3 is a perspective view showing the exploded components of the bicycle handle assembly for the handlebar according to the first embodiment of the present invention.
Figure 4:
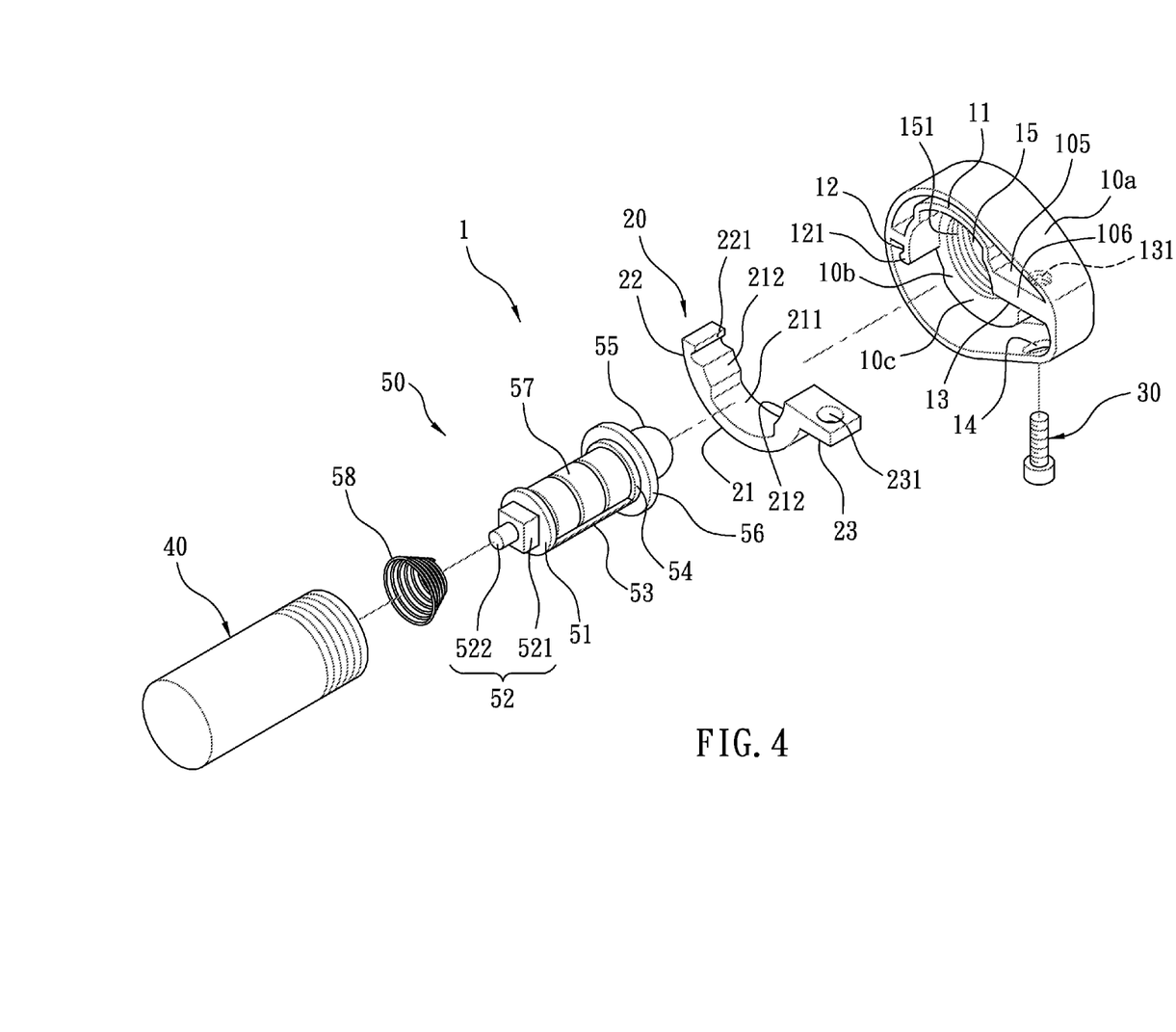
FIG. 4 is another perspective view showing the exploded components of the bicycle handle assembly for the handlebar according to the first embodiment of the present invention.

The housing 40 as shown in FIGS. 3 and 4 is formed in a cylinder shape and includes an inner room and a mouth 42. The mouth 42 includes outer threads 43 arranged on an outer rim of one end thereof to screw with the inner threads 151 of the trench 15, and the housing 40 is received in the receiving space 10c from the distal end of the handlebar 2.

The warning unit 50, as shown in FIGS. 3-4, comprises a circuit board 51, a contact switch 52 electrically connected on the circuit board 51, a LED holder 54 electrically connected with the circuit board 51 by using two electricity conducting members 53, a LED light 55 fixed on the LED holder 54, a waterproof pad 56 fitted on the LED light 55, a plurality of cells 57 installed on the electricity conducting members 53 and electrically connected with the circuit board 51 and the LED holder 54, and a resilient element 58. The resilient element 58 is a compression spring. The cell 57 is provided to supply power to the circuit board 51 and the LED light 55. The contact switch 52 further comprises a base 521 and a button 522 installed on the base 521 to be pressed. One end of the resilient element 58 is abutted against a bottom end of an inner chamber 41, and another end of the resilient element 58 is fitted to the button 522 and is biased against the base 521. The waterproof pad 56 is elastically retained between an inner surface between the LED holder 54 and the circular orifice 152 of the body 10, e.g., on a bottom end of the circular trench 15, so that rain or water can not permeate from the orifice 152 to obtain a waterproof effect.

The warning unit 50 is installed in the inner chamber 41 of the housing 40. When the housing 40 is screwed with the trench 15 of the body 10, the LED holder 54 abuts against a bottom surface of the body 10 by ways of the resilient element 58, and the LED light 55 extends out of the orifice 152 from the body 10 to be pressed by a user. When the LED holder 54 is pressed, the contact switch 52 is actuated to move inward, so that the button 522 of the contact switch 52 is biased against by the inner chamber 41 of the housing 40 to move inward, and the LED light 55 is turned on to emit warning light. Also, when the LED light 55 is pressed once more, the LED light 55 is switched to different-color lights or tuned off. It is to be noted that switching colors or emitting order of the LED light 55 is controlled by designing circuit but is not limited by using the above-mentioned controlling method.

Figure 1:
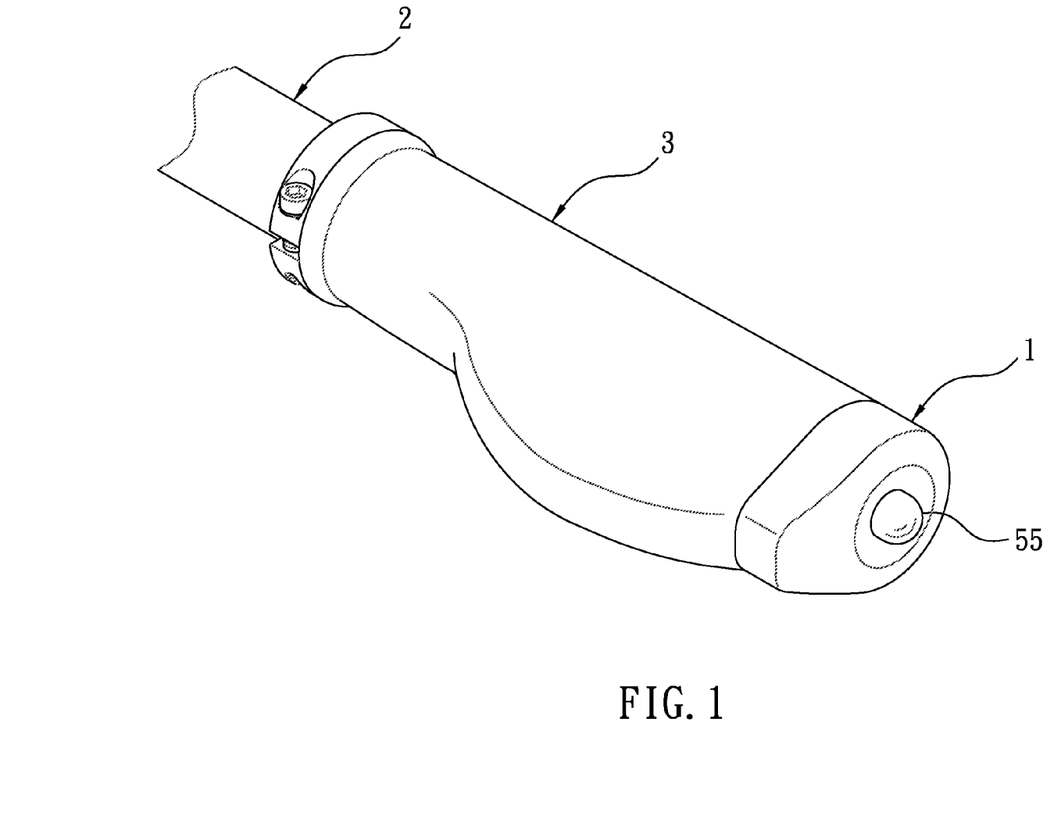
FIG. 1 is a perspective view showing the operation of a bicycle handle assembly for a handlebar according to a first embodiment of the present invention.
Figure 2:
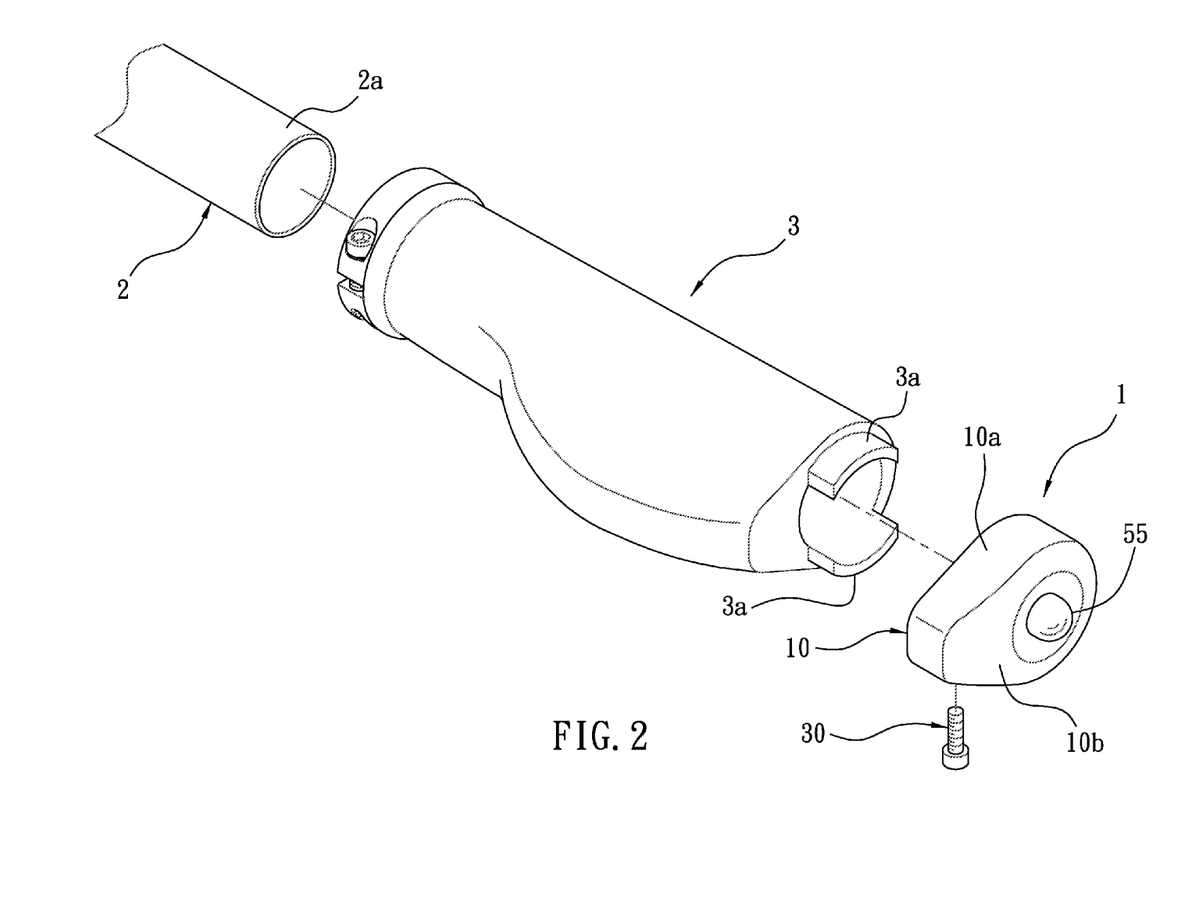
FIG. 2 is a perspective view showing the exploded components of a part of the bicycle handle assembly for the handlebar according to the first embodiment of the present invention.

The peripheral fringe 10a of the retaining device 1 is formed in a certain shape to correspond to the grip 3. Referring to FIG. 2, when the retaining device 1, the handlebar 2, and the grip 3 are connected together, an inner end of the retaining device 1 contacts with an outer end of the grip 3, so that the outer end of the grip 3 is not exposed outside, thus having an aesthetics appearance. Besides, the peripheral fringe 10a is not provided with an elongated gap as a conventional retaining device to have an aesthetics appearance and comfort.

Figure 8:
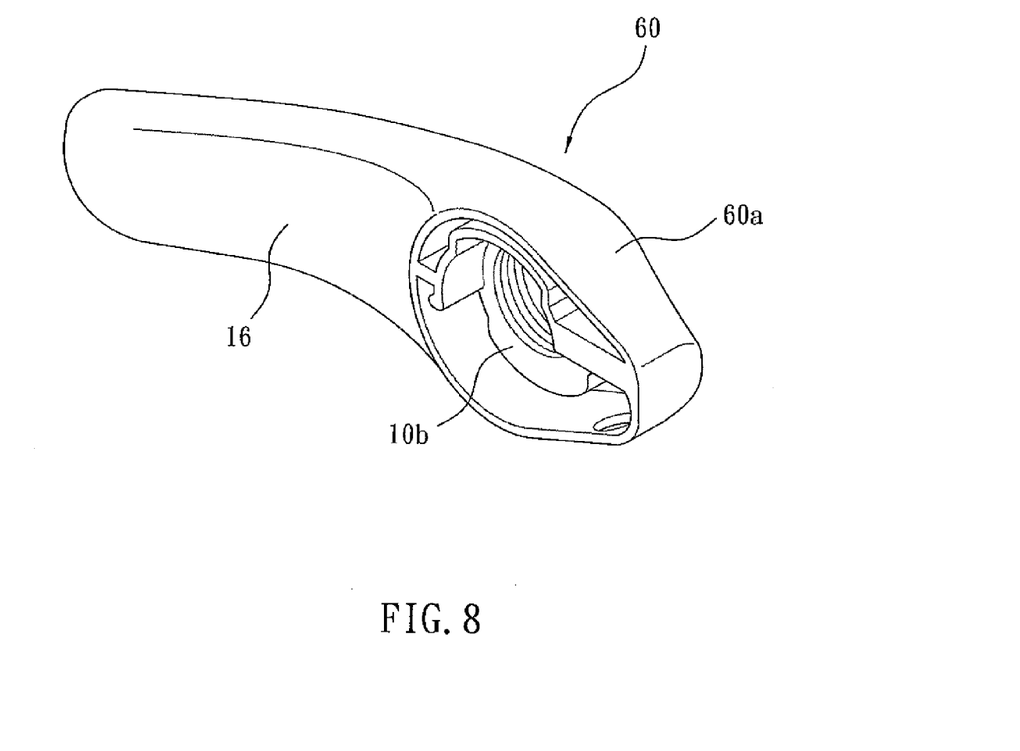
FIG. 8 is a perspective view showing the assembly of a body of a bicycle handle assembly for a handlebar according to a second embodiment of the present invention.
Figure 9:
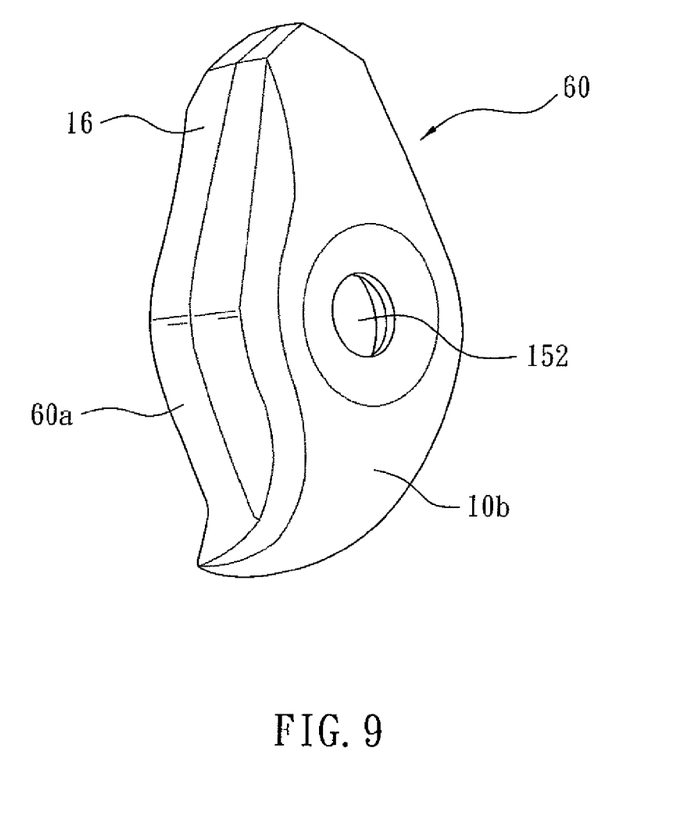
FIG. 9 is another perspective view showing the assembly of the body of the bicycle handle assembly for the handlebar according to the second embodiment of the present invention.

With reference to FIGS. 8 and 9, a difference of a bicycle handle assembly according to a second embodiment of the present invention from that of the first embodiment comprises a body 60 including a peripheral fringe 60a, and the peripheral fringe 60a including a grip 16 integrally extending therefrom or coupled thereon. The retaining device 1 of the second embodiment is designed in a different shape from that of the first embodiment, and a length of the grip 16 is different from that of the first embodiment. Thus, when the retaining device 1 is installed on the handlebar 2 of the bicycle, the retaining device 1 with the grip 16 is used as an auxiliary handle, so that the user maintains different postures based on requirements.

Figure 10:
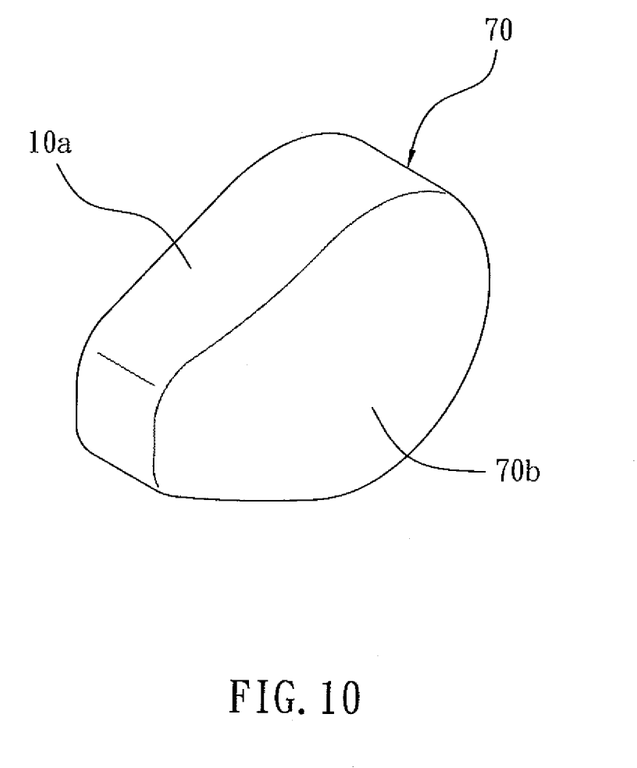
FIG. 10 is a perspective view showing the assembly of a body of a bicycle handle assembly for a handlebar according to a third embodiment of the present invention.

With reference to FIG. 10, a difference of a bicycle handle assembly according to a third embodiment of the present invention from that of the first embodiment comprises a body 70 including a side fringe 70b. The side fringe 70b is a closed surface, the retaining device 1 is not provided with the housing 40 and the warning unit 50 of the first embodiment, and the trench 15 is not necessary in the third embodiment. Hence, when the retaining device 1 is installed on a handlebar 2, it is used as an end plug.

The retaining device 1 of the first, second, and third embodiments are served as an engaging component to retain an outer end of the grip 3 on the handlebar 2 and the LED holder, the auxiliary handle or the end plug. The retaining device 1 is used as the LED holder and the auxiliary handle simultaneously or the auxiliary handle and the end plug simultaneously. Of course, the retaining device 1 is also used as the LED holder, the auxiliary handle, and the end plug respectively instead of the engagement component of the grip 3. In the meantime, the first fixing groove 111 and the second fixing groove 211 are not required.

Figure 11:
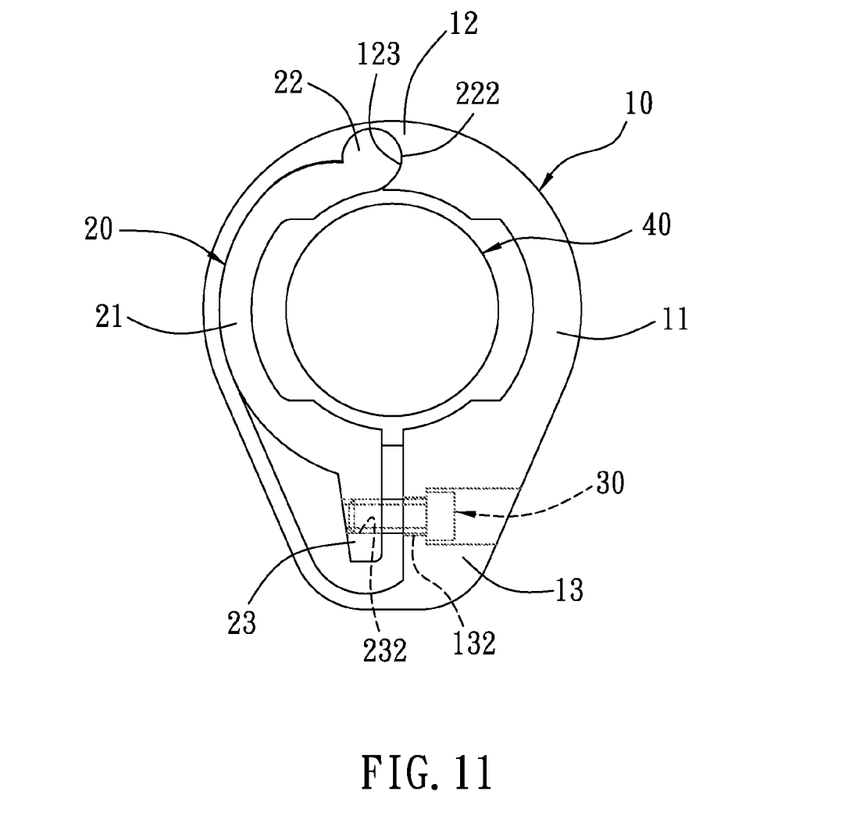
FIG. 11 is a side plan view showing the assembly of a bicycle handle assembly for a handlebar according to a fourth embodiment of the present invention.

As shown in FIG. 11, a difference of a bicycle handle assembly according to a fourth embodiment of the present invention from that of the first embodiment comprises: a first connecting portion 12 of a body 10 including a connection notch 123 for replacing the first hook 121 and the slot 122 of the first embodiment; and a second connecting portion 22 including a coupling post 222 for replacing an integrally formed second hook 221 of the first embodiment. The coupling post 222 of the second connecting portion 22 of the movable retaining member 20 connects with the connection notch 123 of the first connecting portion 12 of the body 10 to form a swinging fulcrum. Hence, the moving portion 23 is moved toward or away from the fixing portion 13. Also, the fixing portion 13 of the body 10 has a pore 132 for replacing the threaded hole 131 of the first embodiment, and the moving portion 23 has a screwing eyelet 232 for replacing the opening 231 of the first embodiment. Thus, the locking element 30 screws with the screwing eyelet 232 via the pore 132, so that the moving portion 23 is moved toward the fixing portion 13.

While various embodiments in accordance with the present invention have been shown and described, it is clear to those skilled in the art that further embodiments may be made without departing from the scope of the present invention.

What is claimed is:

1. A bicycle handle assembly being installed on a handlebar of a bicycle and comprising:
   a grip retained on the handlebar, with the grip including two positioning projections extending outward from an outer side thereof;
   a retaining device including a body, a movable retaining member, and a locking element; wherein:
   the body is one piece and has a peripheral fringe and a side fringe integrally connected with the peripheral fringe to define a receiving space;
   the receiving space includes a first side and a second side;
   the peripheral fringe includes a first engaging portion defined on a predetermined position thereof relative to the first side and includes a first connecting portion and a fixing portion connected with two ends of the first engaging portion;
   the movable retaining member is installed in the receiving space of the body relative to the second side and includes a second engaging portion relative to the first engaging portion and further includes a second connecting portion and a moving portion connected with two ends of the second engaging portion respectively;
   the second connecting portion is used to connect with the first connecting portion of the body;
   the first engaging portion includes a first fixing groove defined on an inner wall thereof to receive one of the two positioning projections;
   the second engaging portion includes a second fixing groove defined on an inner wall thereof to receive another of the two positioning projections;
   the first fixing groove includes two arcuate first locking fences formed on two ends thereof;
   the second fixing groove includes two arcuate second locking fences formed on two ends thereof;
   the locking element is used to force the moving portion of the movable retaining member toward the fixing portion of the body so that an external fence of the handlebar is retained between the first locking fence of the first engaging portion and the second locking fence of the second engaging portion;

one of the two positioning projections is retained between the first fixing groove of the first engaging portion and the handlebar, and another of the two positioning projections is retained between the second fixing groove of the second engaging portion and the handlebar, such that the grip is fixed on the handlebar;

the side fringe of the body is a closed surface so that the retaining device forms a closed end plug to close a distal end of the handlebar; and the peripheral fringe of the body is closed and surrounds around the side fringe of the body so that the movable retaining member hides in the receiving space, such that as a user holds the retaining device, the movable retaining member is not touched by the user.

2. The bicycle handle assembly as claimed in claim 1, wherein a shape of the peripheral fringe of the body is formed to correspond to the grip so that the outer side of the grip is closed by the retaining device.

3. The bicycle handle assembly as claimed in claim 1, wherein the peripheral fringe of the body includes an elongated grip extending therefrom so that the retaining device is used as an auxiliary handle of a bicycle for being held by the user.

4. The bicycle handle assembly as claimed in claim 1, wherein the first connecting portion includes a first hook and a slot defined above the first hook, and wherein the second connecting portion includes an integrally formed second hook to match with the slot to be retained in the slot and engage with the first hook.

5. The bicycle handle assembly as claimed in claim 1, wherein the fixing portion of the body includes a threaded hole defined thereon; wherein the moving portion of the movable retaining member includes an opening arranged thereon to correspond to the threaded hole; and wherein the locking element is a bolt which is screwed with the threaded hole of the fixing portion of the body via the opening of the moving portion so that the moving portion is forced to move toward the fixing portion.

6. The bicycle handle assembly as claimed in claim 5, wherein the peripheral fringe of the body includes an aperture defined on a predetermined position thereof relative to the second side to correspond to the opening, such that the bolt is rotated releasably via the aperture by using a tool.

7. The bicycle handle assembly as claimed in claim 1, wherein the first connecting portion of the body includes a connection notch; the second connecting portion includes a coupling post, such that the coupling post of the second connecting portion of the movable retaining member connects with the connection notch of the first connecting portion of the body to form a swinging fulcrum, and the moving portion is moved toward or away from the fixing portion.

8. The bicycle handle assembly as claimed in claim 1, wherein the fixing portion of the body has a pore, wherein the moving portion has a screwing eyelet, and wherein the locking element is a bolt for screwing with the screwing eyelet via the pore so that the moving portion is forced to move toward the fixing portion.

* * * * *